United States Patent [19]

Ishikawa et al.

[11] Patent Number: 4,985,190

[45] Date of Patent: Jan. 15, 1991

[54] METHOD FOR MOLDING A FILLER-CONTAINING POLYTETRAFLUOROETHYLENE

[75] Inventors: Takamichi Ishikawa; Masumi Nomura, both of Yokohama; Masuho Takeuchi, Tokyo, all of Japan

[73] Assignee: Asahi Glass Company Ltd., Tokyo, Japan

[21] Appl. No.: 359,580

[22] Filed: Jun. 1, 1989

[30] Foreign Application Priority Data

Jun. 3, 1988 [JP] Japan ................................ 63-135639

[51] Int. Cl.$^5$ .............................................. B29C 47/00
[52] U.S. Cl. ....................................... 264/122; 264/127
[58] Field of Search ............................... 264/122, 127

[56] References Cited

U.S. PATENT DOCUMENTS

| | | | |
|---|---|---|---|
| 3,864,124 | 2/1975 | Breton et al. ........................ | 264/122 |
| 3,896,071 | 7/1975 | Poirier . | |
| 4,153,661 | 5/1979 | Ree et al. ............................ | 264/120 |
| 4,615,854 | 10/1986 | Pratt et al. .......................... | 264/127 |

FOREIGN PATENT DOCUMENTS

| | | | |
|---|---|---|---|
| 0113869 | 7/1984 | European Pat. Off. ............ | 264/127 |
| 2413221 | 10/1984 | Fed. Rep. of Germany ...... | 264/127 |

OTHER PUBLICATIONS

The Condensed Chemical Dictionary, 10th Ed., pp. 986 & 1017, 1981.

*Primary Examiner*—Mary Lynn Theisen
*Attorney, Agent, or Firm*—Oblon, Spivak, McClelland, Maier & Neustadt

[57] ABSTRACT

A method for molding a filler-containing polytetrafluoroethylene, which comprises adding a surfactant-containing aqueous medium to a filler-containing polytetrafluoroethylene, followed by extrusion molding.

7 Claims, No Drawings

METHOD FOR MOLDING A FILLER-CONTAINING POLYTETRAFLUOROETHYLENE

The present invention relates to a method for molding a filler-containing polytetrafluoroethylene.

Polytetrafluoroethylene (hereinafter sometimes referred to simply as PTFE) has an extremely high viscosity even when heated to a temperature over the melting point, and is usually hardly moldable by melt extrusion molding. PTFE has excellent heat resistance, chemical resistance, electrical properties and lubricating properties, but it has a drawback that the mechanical strength is low. Therefore, it is common to reinforce PTFE by an addition of glass fibers, graphite, bronze, carbon fibers or other inorganic powders or fibers. To obtain tubes, rods or sheets of such filler-containing PTFE, methods disclosed in e.g. Japanese Examined Patent Publication No. 54578/1986, Japanese Unexamined Patent Publication No. 34661/1975 and the reference material of ICI Company for the molding technique of Fluon PTFE fine powder, are employed for molding. Namely, a filler is mixed to a so-called fine powder, i.e. a polymer obtained by flocculating and drying a PTFE aqueous dispersion obtained by emulsion polymerization of tetrafluoroethylene (hereinafter sometimes referred to simply as TFE), to obtain a composition, and then a liquid lubricant such as naphtha or illuminating kerosine is added thereto. The mixture is preliminarily molded and filled in a cylinder and pressed by a ram so that it is extruded through a nozzle having a shape of a tube, a rod or a sheet, whereby PTFE undergoes plastic deformation. Then, said liquid lubricant is evaporated, followed by baking to obtain a product. This method is known as a paste extrusion molding method.

The content of the filler in such coventional filler-containing PTFE was from 0 to 30% by volume. (In this specification, "% by volume" is a value obtained from the specific gravity. For example, the content of substance B in a composition comprising 20 parts by weight of substance A having a specific gravity of 2 g/cm$^3$ and 90 parts by weight of substance B having a specific gravity of 1 g/cm$^3$ is $$\left( \frac{90}{1} / \left( \frac{90}{1} + \frac{20}{2} \right) \right) \times 100 = 90\%$$

by volume.) Further, in general, the smaller the particle size of the filler is, the more difficult the molding operation becomes. In the case of a fibrous filler, extrusion molding used to be extremely difficult when the amount of filler was a few % by volume or more.

On the other hand, in a product which usually contains no PTFE such as food products or building materials, it is known to incorporate PTFE in an amount of from 1 to 2% by weight for the purpose of improving the surface smoothness of the extruded product. However, the extruded product used to have large pores, and it used to be difficult to obtain dense molded products.

Whereas, it is an object of the present invention to improve the extrusion moldability of a composition which has already been mixed and to obtain a molded product which is capable of preventing gas or moisture from permeation.

In the conventional paste extrusion molding method of a composition, a liquid lubricant is preliminarily incorporated in order to facilitate the plastic molding of PTFE prior to extrusion, as mentioned above. The lubricant to be used for this purpose is required to be capable of readily wetting PTFE and readily removable from the extruded product, and it is further required not to leave a residue when burned and be free from coloring by baking. As an extrusion lubricant fulfilling these conditions, an aliphatic or aromatic hydrocarbon or alcohol having a boiling point of from 50 to 400° C. may be used as disclosed in Japanese Examined Patent Publication No. 54578/1986. Usually, however, a liquid such as naphtha or illuminating kerosine having a boiling point of from 100 to 200° C. is added in an amount of from 10 to 30%. However, during the extrusion, such filler not only does not undergo plastic deformation by itself but also tends to hinder the plastic deformation of PTFE. Therefore, to obtain an extruded product of a filler-containing PTFE having practical strength and flexibility, the amount of the filler used to be reduced. Therefore, it has been difficult to obtain tubes, rods or sheets of PTFE having a high content of filler, which are dense and free from large pores and excellent in the mechanical strength.

As mentioned above, such a difficulty tends to increase as the particle size becomes fine, and in the case of a fibrous filler, the extrusion properties tend to be impaired as the aspect ratio (fiber length/fiber diameter) increases. Even if a large amount of the extrusion lubricant is added for the purpose of improvement, there will be a drawback such that the pressure remarkably increases during the extrusion, and the lubricant is likely to leak out of the extrusion die, whereby the intended effects can not be obtained. Therefore, in the case of a fibrous filler, the practical amount of the filler for extrusion is not higher than few % by volume, and there has been no PTFE extruded product containing a substantial amount of fibrous filler and having adequate strength.

The present invention has been made to solve the above-mentioned problems and provides a method for molding a filler-containing polytetrafluoroethylene, which comprises adding a surfactant-containing aqueous medium to a filler-containing polytetrafluoroethylene, followed by extrusion molding.

Now, the present invention will be described in detail with reference to the preferred embodiments.

In the present invention, the polytetrafluoroethylene includes not only a homopolymer of tetrafluoroethylene but also a modified product obtained by copolymerizing other comonomer in a small amount (i.e. at a level of about 0.5 mol% or less) not to impart melt flowability. As such a comonomer, hexafluoropropylene, chlorotrifluoroethylene, perfluoro(alkyl vinyl ether), perfluoro(alkoxy vinyl ether), trifluoroethylene or perfluoroalkylethylene may be mentioned. If the molecular weight of PTFE is too low, the polymer tends to be liquid or gel-like, such being undesirable. It is preferred to contain at least 50% of a solid having a molecular weight of at least 10$^6$ as calculated from the standard specific gravity. Such PTFE is preferably the one obtained by emulsion polymerization in view of the compatibility with the filler, or in view of the efficiency for fibrillation as described hereinafter. However, PTFE obtained by such emulsion polymerization may further contain fine powder of PTFE obtained by other polymerization method.

In the present invention, as the filler, either organic or inorganic filler may be employed. Further, filler may be in the form of either powder or fiber. Specifically, it may be a carbon material such as carbon black, carbon fiber or graphite, an oxide powder such as feldspar, silica, alumina, titanium oxide or iron oxide, an inorganic powder such as silicon nitride, carbon nitride, aluminum nitride, boron nitride, zirconium carbide, silicon carbide, tungsten carbide, nickel sulfide, zirconium sulfate, barium sulfate, kaoline, clay, glass beads or glass balloons, an inorganic fiber such as glass fiber, alumina fiber, potassium titanate fiber or silica fiber, a metal or alloy powder such as copper alloy, zinc white, molybdenum disulfide, aluminum or aluminum alloy, or an organic powder or fiber of e.g. a perfluoroalkoxy resin, a perfluoroethylenepropylene resin, a polychlorotrifluoroethylene resin, a polyamide resin, a polyamideimide resin, a polyetherimide resin, a polyethersulfone resin, a polyimide resin, a polyphenyleneoxide resin, a polyphenylenesulfide resin, an oxybenzoylpolyester resin, a polyetherether ketone resin or a liquid crystal polymer, may be mentioned. It is preferred to employ a filler in a powder form, particularly in a fine powder form.

In the molding method of the present invention, it is important that an aqueous medium containing a surfactant is added. Such surfactant may be an anionic surfactant, a cationic surfactant, an amphoteric surfactant or a non-ionic surfactant. Further, the surfactant may be of a water soluble type or an oil-soluble type. However, a water soluble type surfactant is preferably employed. A fluorinated-type surfactant is preferred, since it provides excellent effects in a small amount. Further, it is preferred to employ an aqueous medium containing from 0.001 to 1.0% by weight of the surfactant.

Further, the surfactant-containing aqueous medium may contain an additive in addition to the surfactant and water. Such additive includes a water-soluble organic material such as an alcohol, an additive which makes a medium more viscous, or fine particles of a fluorine-containing polymer. The fine particles of the fluorine-containing polymer may be not only a perfluoropolymer such as a polytetrafluoroethylene, a tetrafluoroethylenehexafluoropropylene copolymer or a tetrafluoroethyleneperfluoro(alkyl vinyl ether) copolymer, but also an incompletely fluorinated polymer or elastmeric polymer such as an ethylene-tetrafluoroethylene copolymer, a polychlorotrifluoroethylene, a tetrafluoroethylenepropylene copolymer or a tetrafluoroethylene-vinylidene fluoride hexafluoropropylene copolymer. As such an aqueous medium containing fine particles of a fluorine-containing polymer, it is preferred to employ a suspension or emulsion obtained by suspension polymerization or emulsion polymerization of a fluorine-containing monomer in a surfactant-containing aqueous medium. Among them, an aqueous dispersion of polytetrafluoroethylene is most preferred. When the aqueous dispersion of polytetrafluoroethylene is used, the polytetrafluoroethylene remaining after molding is fibrillated, whereby a stronger molded product is obtainable. Further, it is also preferred to employ a rubber latex, particularly a fluorinated-type rubber latex having high affinity with PTFE, since the strength of the molded product will thereby be improved.

When an aqueous medium containing fine particles of a fluorine-containing polymer is employed as the aqueous medium, the polymer content is preferably at most 90% by weight, more preferably at most 70% by weight, particularly at most 60% by weight, in view of the stability of the aqueous medium and extrusion moldability. Further, the lower limit of the content of the fluorine-containing polymer is preferably about 5% by weight. As the viscosity increasing additive, methyl cellulose may be mentioned. When a viscosity increasing additive is added it is preferably at most 20% by weight, more preferably at most 10% by weight. The amount of the surfactant may suitably be selected within a range of at least 0.01% by weight. However, if the amount of the surfactant is excessive, a color change or the like is likely to result during the baking of the molded product, such being undesirable. The amount of the surfactant is usually from 0.01 to 1.0% by weight, preferably from 0.05 to 0.5% by weight. It is usually preferred to use an organic liquid which is commonly used for extrusion molding, in combination with the above aqueous medium, whereby extrusion moldability will further be improved, and a molded product having excellent physical properties will be obtained. As such an organic liquid, solvent naphtha, illuminating kerosine, petroleum ether, isopropyl alcohol, liquid paraffin, ethylene glycol, glycerol, butylpentylphthalate or polyalkyl glycol may be mentioned. Among them, a petroleum-type or aliphatic solvent is preferred. When the surfactant-containing aqueous medium and the organic liquid are used in combination, it is preferred that the water content in the total amount of the surfactant-containing aqueous medium and the organic liquid is from 1 to 80%, more preferably from 5 to 60%, particularly from 10 to 40%.

In the present invention, the surfactant-containing aqueous medium is used usually in an amount substantially equal to the amount of an extrusion lubricant which is commonly used for extrusion molding of a filler-containing PTFE. Specifically, it is used usually in an amount of from 5 to 40 parts by weight, preferably from 10 to 35 parts by weight, per 100 parts by weight of the composition comprising PTFE and the filler.

Further, in the molding method of the present invention, it is preferred that a composition of PTFE and the filler is first prepared, and the surfactant-containing aqueous medium is added thereto prior to molding. For the preparation of the composition of PTFE and the filler, there may be a method wherein a predetermined amount of filler is added to a dispersion of PTFE for cocoagulation, followed by drying, or a method wherein a PTFE powder and the filler are stirred and mixed. The cocoagulation method is preferably employed, since the degree of fibrillation of PTFE is thereby small, and the subsequent molding operation will be easy. When the surfactant-containing aqueous medium is added and mixed to the composition of PTFE and the filler, such operation is preferably conducted under a condition where fibrillation of PTFE will be minimum. As such a method, it is preferred to employ a method of using a mixer which is less likely to impart mechanical shearing force (for example, an omni mixer) or a method wherein the mixing is conducted under a mild condition. The composition having the surfactant-containing aqueous medium added and mixed, is preliminarily molded into blocks, followed by extrusion molding into a preform. The extrusion molded product is subjected to evaporation of the aqueous medium and then baked to obtain a final product. Further, prior to the evaporation of the aqueous medium, the composition may be subjected to processing such as rolling or compressing to form a sheet, followed by baking.

There is no particular restriction as to the manner of extrusion molding in the present invention. A wide range of conventional techniques for extrusion molding, such as, screw extrusion, ram extrusion and paste extrusion, may be employed.

There is no particular restriction as to the temperature for extrusion, and it may be suitably selected within a range of not higher than the decomposition temperature of PTFE. Usually, a temperature of from 30 to 90° C. is employed in view of the extrusion operation efficiency, easiness for plastic deformation of PTFE and economy.

There is no particular restriction as to the molding die to be used for extrusion molding. However, it is preferred to employ a die having a large ratio of the cross sectional area of the cylinder to the cross sectional area of the nozzle (the ratio may hereinafter sometimes be referred to as RR (reduction ratio)), since the fibrillation of PTFE is thereby promoted. However, if the ratio is too large, the extrusion efficiency decreases, such being undesirable. Usually, RR is within a range of from 5:1 to 200:1.

The molding method of the present invention is useful for molding a filler-containing PTFE. There is no particular restriction as to the amount of filler in the filler-containing PTFE used here. The method of the present invention is effectively used for PTFE having various filler contents. For example, the filler may be employed within a range of from 5 to 95% by volume, preferably from 10 to 90% by volume. The difference of the present invention over the case where the conventional extrusion lubricant is employed, is remarkable particularly when the filler content is high i.e. in the molding of a highly filled PTFE. According to the method of the present invention, even when the filler content is as high as at least 50% by volume, it is possible to obtain a dense molded product having a smooth surface under a low extrusion pressure. The upper limit of the filler content is usually at most 95% by volume, preferably at most 90% by volume, since if the filler content is too high, molding will be difficult.

Now, the present invention will be described with reference to Examples and Comparative Examples. However, it should be understood that the present invention is by no means restricted by such specific Examples.

EXAMPLES 1 to 6 and COMPARATIVE EXAMPLES 1 to 3

To the mixture of PTFE and the filler as identified in Table 1, 300 parts by weight of a processing aid (a chlorine type solvent, Tricene, tradename, manufactured by Asahi Penn Chemical Company Ltd.) to PTFE composite (PTFE+filler) was added, and the mixture was stirred and dried to obtain a composition. To this composition, the surfactant-containing aqueous medium and/or the organic liquid as identified in Table 1 (as additives) was added, and the mixture was subjected to paste extrusion by means of an extruder with RR=20, followed by calendering to obtain a molded sheet product. This sheet product was dried and baked to obtain a test piece.

By using such a test piece, the tensile strength and the average pore diameter were measured. The results are shown in Table 1 together with the pressure for paste extrusion molding and the appearance of the extruded product. The tensile strength was measured by means of an Instron type universal tester in accordance with JIS K6891. The average pore size was measured by means of a mercury injection type prosimeter Model 220 (manufactured by Kaluroerba Company, Italy).

TABLE 1

| | | Examples | | | | | | Comparative Examples | | |
|---|---|---|---|---|---|---|---|---|---|---|
| | | 1 | 2 | 3 | 4 | 5 | 6 | 1 | 2 | 3 |
| Composite (parts by weight) | PTFE (2.15) | 20 | 20 | 20 | 20 | 30 | 20 | 20 | 20 | 40 |
| | Silica (2.60) | 80 | 80 | 80 | — | — | — | 80 | — | 60 |
| | Titanium oxide (4.26) | — | — | — | 80 | — | — | — | 80 | — |
| | Clay (2.60) | — | — | — | — | 60 | 80 | — | — | — |
| | Alumina fiber (3.90) | — | — | — | — | 10 | — | — | — | — |
| Additive (parts by weight) | AD-1 | 40 | 10 | 20 | 10 | 15 | — | — | — | — |
| | Softanol 30: 0.1 wt % Metorose: 5 wt % Aqueous solution | — | 15 | — | — | — | 20 | — | — | — |
| | Isoper M | — | — | 17 | 17 | 17 | — | 25 | 25 | 25 |
| Pressure for extrusion (kg/cm$^3$) | | 230 | 145 | 65 | 61 | 150 | 175 | 750 | 950 | 500 |
| Appearance of extruded product | | Smooth surface | Smooth surface | Smooth surface | Smooth surface | Smooth surface | Smooth surface | Substantial irregularities, Discontinuous | Substantial irregularities, Discontinuous | Substantial irregularities, Discontinuous |
| Tensile strength (kg/cm$^2$) | | 25 | 20 | 20 | 35 | 50 | 25 | at most 5 | at most 5 | 10 |
| Average pore diameter (μm) | | 0.1 | 0.2 | 0.1 | 0.2 | 0.5 | 0.6 | 0.8 | about 1.0 | about 1.0 |

In Table 1, the numerical values in the brackets ( ) in the column for "composite" represent the specific gravity (g/cm$^3$). In the column for "additive", AD-1 is a PTFE dispersion manufactured by Asahi Fluoropolymers Co., Ltd. (resin concentration: 60% by weight, nonionic surfactant: containing 3% by weight of ammonium perfluoroethyleneoxide), Softanol 30 is a nonionic surfactant, sold by Nippon Shokubai Kagaku Kogyo K.K., Metorose is hydroxypropylmethyl cellulose manufactured by Shinetsu Chemical Industries Company Limited, and Isoper M is a petroleum-type hydrocarbon manufactured by Exxon Corporation.

The present invention makes paste extrusion molding of a highly loaded filler-containing PTFE possible, which used to be impossible. Namely, even when a fibrous filler is employed or even when the filler is fine and used in a large amount, it is possible to obtain a uniform extrusion molding product without impairing the moldability.

The present invention makes it possible to prepare a excellent molded product having excellent surface smoothness and a small average pore diameter under a low extrusion pressure even when various kinds of fillers are used in various amounts as the filler for PTFE.

Further, by using an aqueous dispersion of e.g. a fluorine resin of the present invention, fine particulate solid remains in the filler-containing PTFE molded product after extrusion molding, and network effects will result when the extruded product is baked, whereby the strength is improved, and it is thereby possible to obtain an excellent product which is dense and flexible.

Further, when an aqueous dispersion of e.g. a fluorine resin of the present invention is used alone or used as a mixture with the aqueous liquid, it is a non-inflammable liquid, whereby it is unnecessary to provide an expensive explosion preventing installation for the molding apparatus, and the operational safety is remarkably improved.

What is claimed is:

1. A method for extrusion molding dense, filler-containing polytetrafluoroethylene free from large pores, comprising:
    adding an aqueous dispersion comprising a fluorine-containing polymer to a filler-containing polytetrafluoroethylene, followed by exrtrusion molding.

2. The method according to claim 1, wherein the fluorine-containing aqueous dispersion is an aqueous dispersion of a polytetrafluoroethylene.

3. The method according to claim 2, wherein the aqueous dispersion of a polytetrafluoroethylene is a dispersion containing from 1 to 90% by weight of a polytetrafluoroethylene.

4. The method according to claim 1, wherein the fluorine-containing aqueous dispersion is added in an amount of from 5 to 40 parts by weight per 100 parts by weight of the filler-containing polytetrafluoroethylene.

5. The method according to claim 1, wherein an organic liquid is further added before the extrusion molding.

6. The method according to claim 5, wherein the organic liquid is a petroleum or aliphatic solvent.

7. The method according to claim 1, wherein the filler-containing polytetrafluoroethylene contains from 5 to 95% by volume of a filler.

* * * * *